United States Patent [19]

Stearns et al.

[11] Patent Number: 5,083,436
[45] Date of Patent: Jan. 28, 1992

[54] WORKPIECE CHILLING AND SHRINKING

[75] Inventors: Thornton Stearns, Winchester; Russell W. Blanton, Acton, both of Mass.

[73] Assignee: Vacuum Barrier Corporation, Woburn, Mass.

[21] Appl. No.: 538,214

[22] Filed: Jun. 14, 1990

[51] Int. Cl.⁵ .............................................. F25D 13/06
[52] U.S. Cl. .......................................... 62/63; 62/50.2; 62/374; 62/380
[58] Field of Search ...................... 62/63, 65, 374, 375, 62/380, 50.2

[56] References Cited

U.S. PATENT DOCUMENTS

| | | | |
|---|---|---|---|
| 3,405,531 | 10/1968 | Davis, Jr. et al. | 62/374 |
| 3,455,120 | 7/1969 | Schlemmer | 62/380 |
| 3,485,055 | 12/1969 | Webster et al. | 62/63 |
| 3,879,954 | 4/1975 | Cann | 62/63 |
| 4,637,216 | 1/1987 | Shenoy et al. | 62/500 |

Primary Examiner—Ronald C. Capossela

[57] ABSTRACT

An apparatus for chilling and shrinking workpieces being conveyed to a workstation on an assembly line comprises, a chilling chamber, a conveyer for transporting workpieces, at least one generally vertical conduit for transporting cryogenic liquid out of a bath to an outlet above the bath, wells for storing cryogenic fluid bath, baffles for slowing the counterflow of cryogenic vapor and a lid for maintaining vapor in the chilling chamber. The workpieces first go through the pre-cooling process where cryogenic vapor flows in a counterflow to chill the workpieces. The workpieces move through openings in the baffles, and after the pre-cooling process, the conveyer transports the workpieces to the cooling stage where baths of cryogenic liquid are stored in wells. Generally vertical conduits are immersed in the wells. The density of cryogenic fluid in the conduit is reduced by warm vapor, enabling the cryogen to flow up the conduit. Cryogen reaching the outlet above the bath is sprayed onto workpieces transported by the conveyer. Cryogenic vapor resulted from the spraying flows to the pre-cooling section where it forms the counterflow discussed above.

18 Claims, 4 Drawing Sheets

WORKPIECE CHILLING AND SHRINKING

BACKGROUND OF THE INVENTION

This invention relates to chilling and shrinking workpieces being conveyed to a workstation on an assembly line.

Often it is desirable to chill and shrink workpieces in order to fit or press them into a larger assembly. For example, valve seats, valve guides or cylinder liners need to be chilled so that they can be fit or pressed into the block of an internal combustion engine.

Various means of cooling or chilling workpieces have been proposed. For example, Ross U.S. Pat. No. 2,218,722 discloses a workpiece chilling device for use on an assembly line. The device has a chilling tray which comprises a lower compartment containing a chilling agent such as temperature controlling liquid air and an upper compartment containing a light fluid oil into which workpieces are immersed for chilling.

Colestock U.S. Pat. No. 3,621,550 discloses a refrigeration chamber to chill valve seats that are stored in a vertical magazine. The valve seats are chilled in a refrigerator chamber, and the chilled valve seats are transferred from the bottom of the magazine (by a pneumatic cylinder) to an assembly station.

Emerich U.S. Pat. No. 1,980,156 discloses means for making an expansion fit using carbon dioxide to shrink bushings. The carbon dioxide is led into the cooling chamber through a pipe.

Allen et al. U.S. Pat. No. 1,955,728 discloses a method and tool for inserting bushing in, or removing it from outer member by spraying the bushing with $CO_2$ and a low-freezing point liquid.

Hofmann U.S. Pat. No. 4,713,942 discloses a method for cooling an object by contact with superfluid helium (He II) with a forced flow of He II to remove heat from the object McCandles U.S. Pat. No. 2,487,821 discloses a method of cooling a metal object by advancing the object through a chamber having a thermally conductive wall. The outside of the chamber is cooled with a cooling liquid medium, and the object inside the chamber is further cooled by flowing a portion of the vaporizing cooling medium into the chamber in a counter direction relative to the direction of advance of the object.

De Brosse U.S. Pat. No. 3,025,680 discloses a cooling system that uses liquid nitrogen for cooling certain electronic apparatus. Liquid coolant circulates in a closed Stearns U.S. Pat. No. 3,972,202 discloses an apparatus for delivering cryogenic liquid to a heat exchanger where the cryogenic liquid is vaporized to effect cooling.

Stearns U.S. Pat. No. 4,715,187 discloses a system for delivering a controlled stream of liquid cryogen from a bath to an outlet and means to maintain cryogen in liquid phase as it flows through the conduit.

SUMMARY OF THE INVENTION

In general, the invention features, in one aspect, an apparatus for chilling and shrinking workpieces being conveyed to a workstation on an assembly line. A conveyer guide (e.g. stationary rails) for transporting workpieces is positioned over a bath of cryogenic liquid. At least one generally vertical conduit extends from within the cryogenic fluid bath to an outlet above the conveyer. The density of cryogen in the conduit is reduced, so that cryogen flows up the conduit, out of the outlet, and onto workpieces on the conveyer.

A second aspect of the invention features an apparatus for chilling and shrinking workpieces being conveyed to a workstation on an assembly line. A guide or conveyer is used to guide workpieces through the baffles and to the workstation. A counterflow of cryogen is produced and flows in a direction opposing the direction of workpiece movement. Baffles are positioned around the conveyer to localize circulation around the workpiece and to allow good heat transfer.

In preferred embodiments, the first two aspects of the invention are combined, so that the workpieces are transported along the guide/conveyer through the pre-cooling stage before they reach the portion of the conveyer over the bath. A counterflow of cryogen flows into the pre-cooling stage in a direction opposing the direction of workpiece movement, and baffles positioned around the conveyer are used in the pre-cooling stage as in the second aspect of the invention. Vaporized cryogen from the conduit outlet above the conveyer provides the cryogen counterflow. The outlet of the conduit is a spray nozzle for distributing a cryogen spray over the workpieces. To create fluid flow up the conduit, warm vapor is transported into the conduit. The cryogen counterflow is maintained by a lid covering the top of the chilling chamber.

A third aspect of the invention features a method of chilling and shrinking workpieces being conveyed to a workstation on an assembly line. The workpieces are guided along a conveyor positioned over a bath of cryogenic fluid. At least one generally vertical conduit extends from within the bath to an outlet. Density of cryogen in the conduit is reduced and cryogen flows up the conduit, then through the outlet, where it is released onto workpieces.

A fourth aspect of the invention features a method of chilling and shrinking workpieces being conveyed to a workstation on an assembly line. The workpieces are transported through the baffles by a conveyer, and are pre-cooled by cryogen flowing in the direction opposite to conveyer movement.

In preferred embodiments, the third and fourth aspects of the invention are combined, so that the workpieces are first pre-cooled with a counterflow of cryogen, and then sprayed with cryogenic fluid released from the outlet. For pre-cooling, the workpieces are transported through the baffles as the cryogen flows in the direction opposite to conveyer movement and through the baffles. Warm vapor is provided (e.g. in the conduit) to reduce the density of cryogen in the conduit and thereby create cryogen flow up the conduit. The cryogen counterflow flows along the conveyer and through the baffles.

The advantages of the invention include the following. The chilling and shrinking method provides an efficient use of cryogen. The cryogen produced by the spray is used for the pre-cooling process after it has been used to chill the workpieces in the cooling stage. The chilling chamber is configured so that the cryogen flows by gravity with no need of mechanical pumping. The configuration of the chilling apparatus also helps to control undesirable vapor condensation and frost formation.

Other features and advantages of the invention will be apparent from the following description of the preferred embodiments, and from the claims.

DESCRIPTION OF THE PREFERRED EMBODIMENT BRIEF DESCRIPTION OF THE DRAWINGS

FIG. 1A is a view along 1A—1A of FIG. 1, showing the side view of a baffle of the chilling apparatus.

Figure 1:
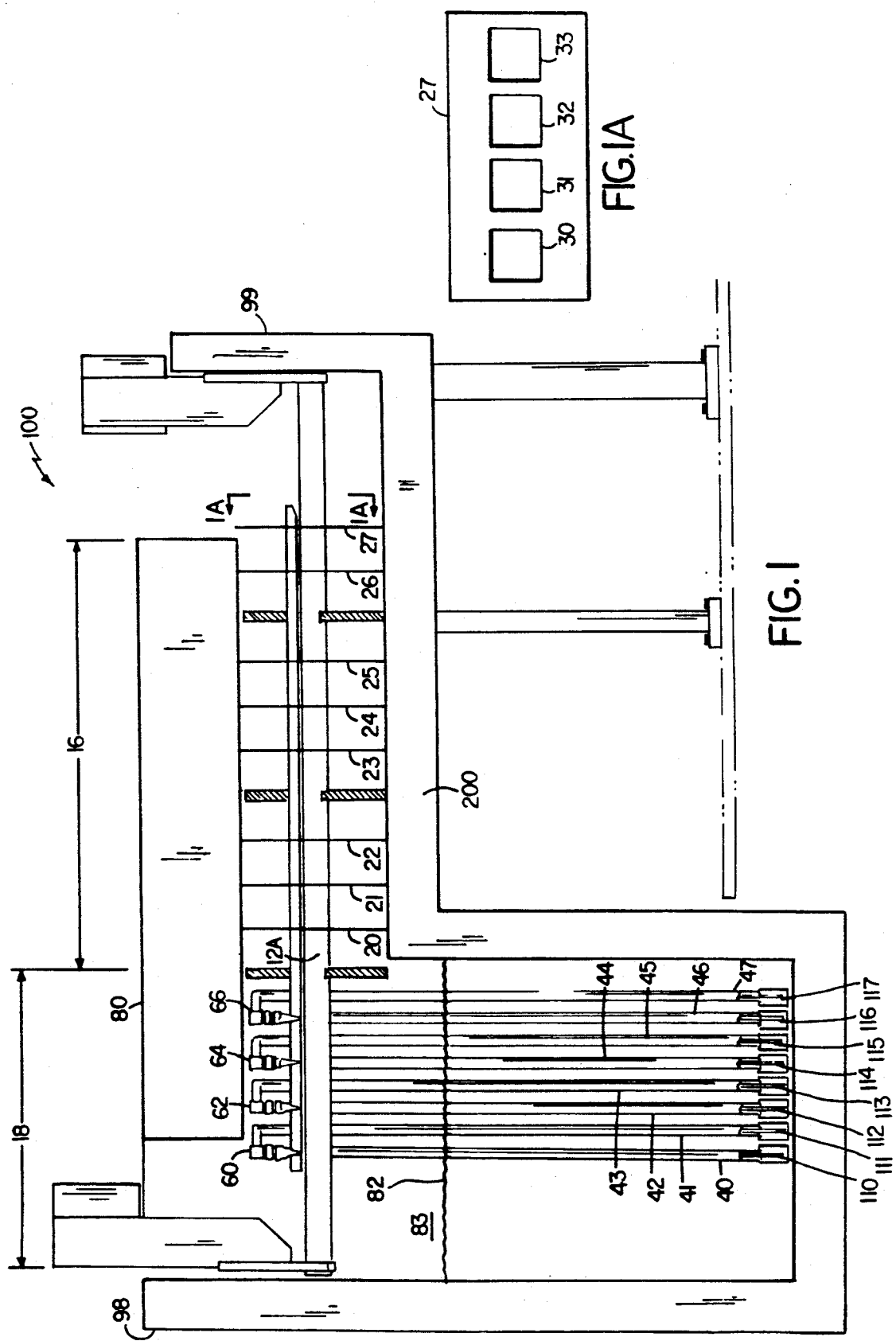
FIG. 1 is a side view, partially in section, along 1—1 of FIG. 2 of the apparatus for chilling and shrinking workpieces being conveyed to an assembly line workstation.
Figure 2:
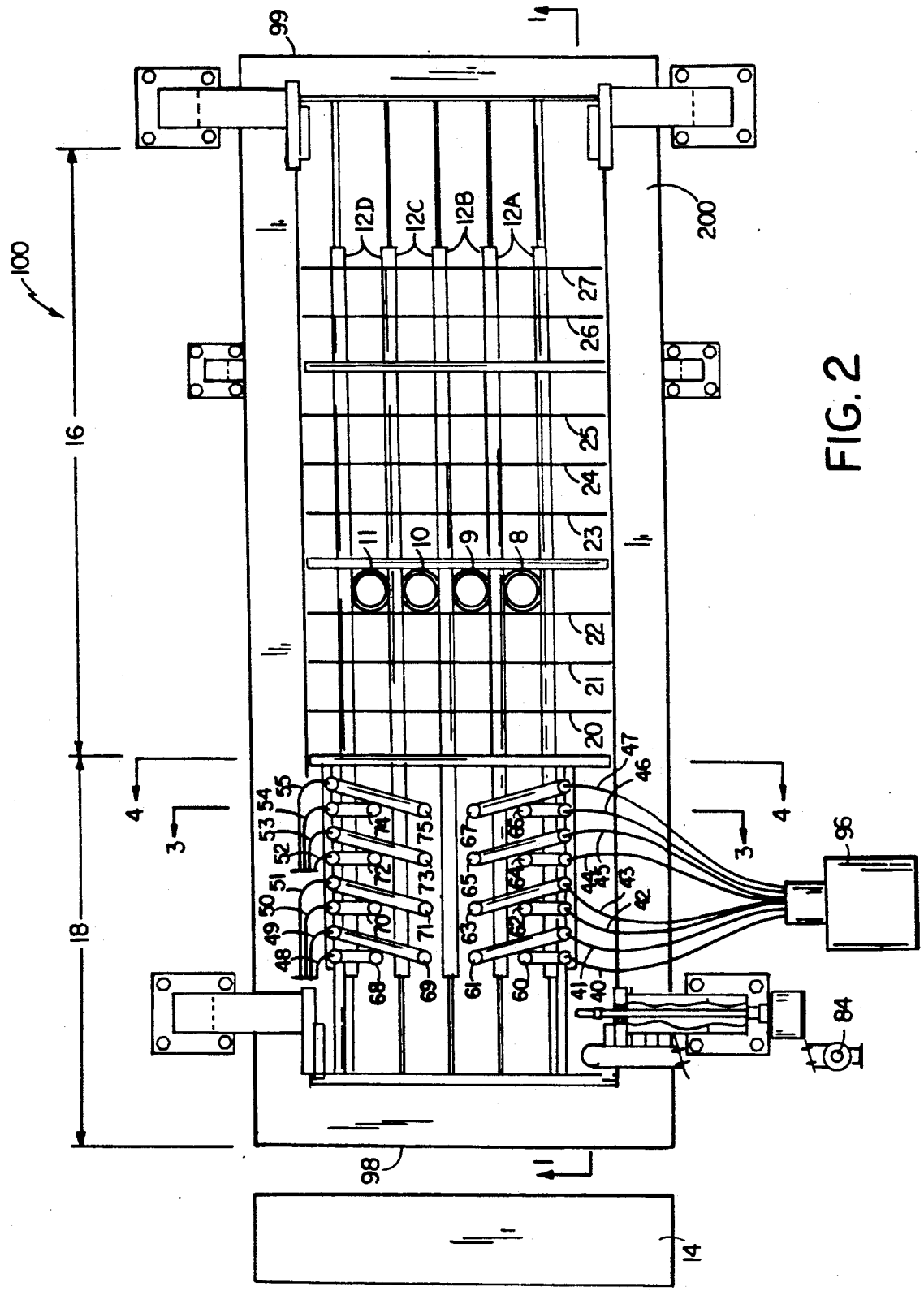
FIG. 2 is the top view of the apparatus with the lid removed for chilling and shrinking workpieces being conveyed to an assembly line workstation.
Figure 3:
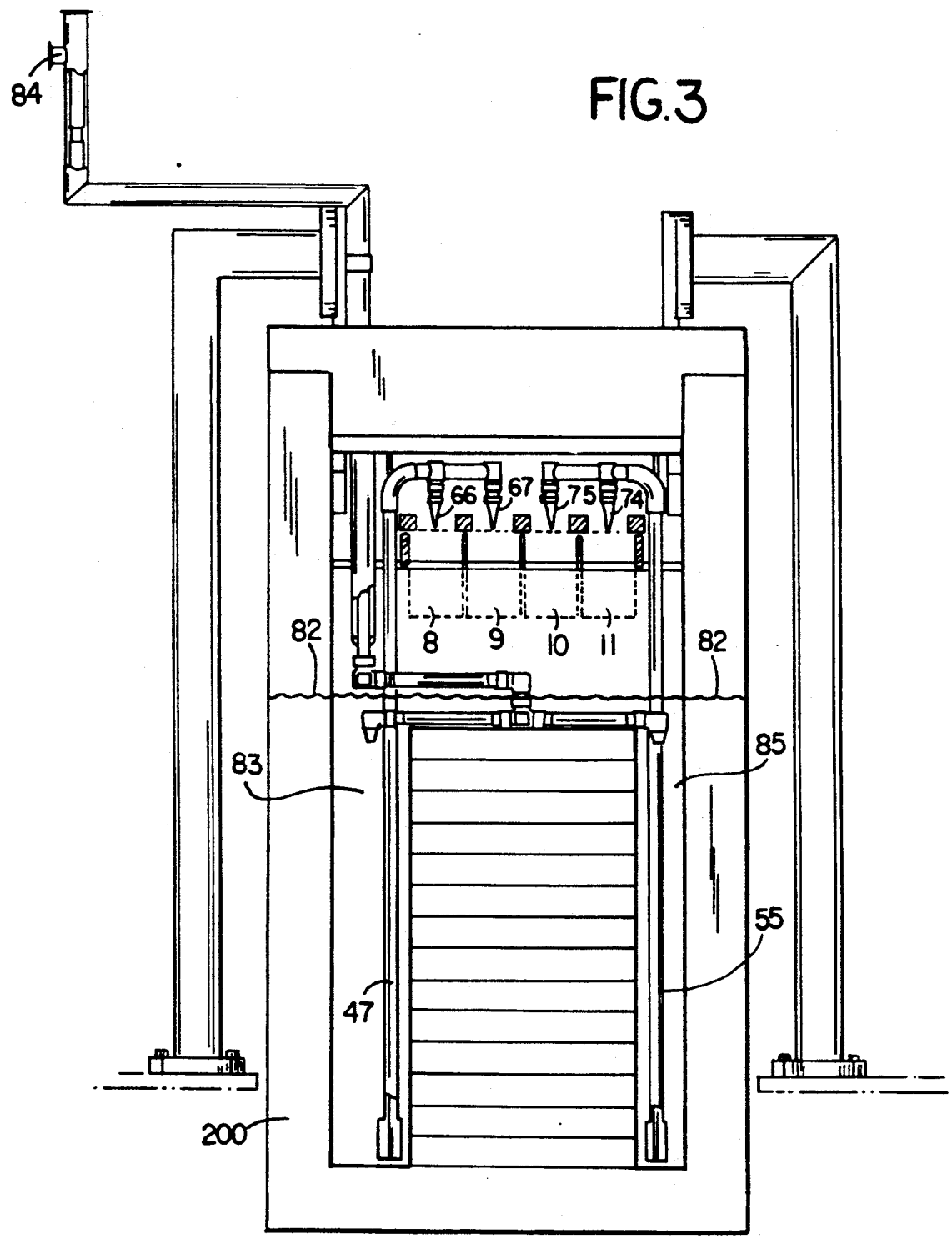
FIG. 3 is the cross-section view of apparatus for chilling and shrinking workpieces and also a section view along 3—3 of FIG. 2.

In FIGS. 1-3, the workpieces 8-11 are carried on four parallel pairs conveyer rails 12A-12D from a storage hopper (not shown) and then transported to an assembly line workstation 14 where the workpieces are fit or pressed into a larger assembly. In FIG. 1 the conveyer passes through the chilling and shrinking chamber 100 which includes a pre-cooling stage 16 where eight baffles 20-27 (see FIG. 1A) are positioned to slow transport of cryogenic vapor as described in more detail below. The baffles are fit tightly in the chilling chamber 100. There are four openings 30-33 in the center of each baffle which allows the workpieces to pass through.

Figure 4:
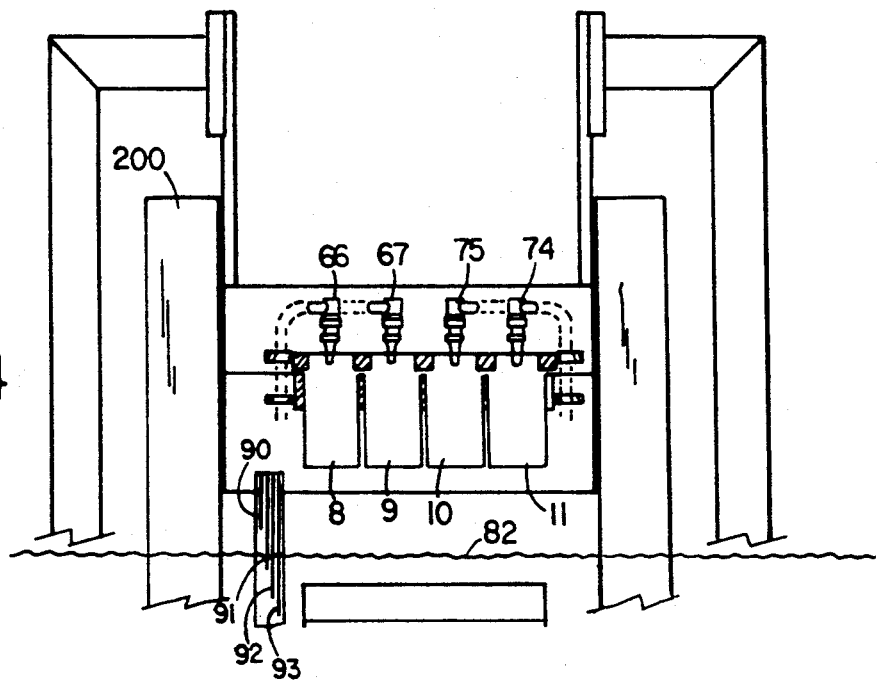
FIG. 4 is the cross section view of apparatus for chilling and shrinking workpieces and also a section view along 4—4 of FIG. 2.

The four conveyer rails extend through pre-cooling stage 16 into a cooling stage 18, over a bath of cryogenic fluid having a liquid level 82 (FIG. 4) stored in wells 83 and 85 (FIG. 3). Sixteen conduits 40-55 connected to sixteen outlets 60-75 used for spraying a mixture of cryogenic liquid and vapor are immersed in cryogenic fluid bath with eight conduits on each side of the bath. Each conduit is connected to a separate outlet above the conveyer. Cryogen from the outlets is sprayed onto the workpieces above the conveyer. As shown in FIGS. 1 and 2, bath wall 98 (close to outlets 60-75) is slightly higher than bath wall 99 (away from the outlets). Therefore, dense cryogen flows over wall 99, and wall 99 acts as a weir to maintain the cryogen level below wall 98. This weir effect helps to create cryogen flow in a direction counter to workpiece movement to pre-cool workpieces in stage 16. Lid 80 is used to maintain the cryogenic vapor in the chilling chamber 100. An insulated wall 200 surrounds the chilling chamber. Dry vapor is used to maintain the insulated interior space 200 dry and to control condensation.

Cryogenic fluid is transported into the chilling apparatus via inlet 84 in FIG. 2. The desired level of the cryogenic fluid level 82 is maintained by 4 sensors, 90-93 in FIG. 4. Sensor 90 is to signal fluid bath overflow. Sensors 91 and 92 are used to maintain the bath within those limits; sensor 93 is to signal a low bath level warning.

Figure 5:
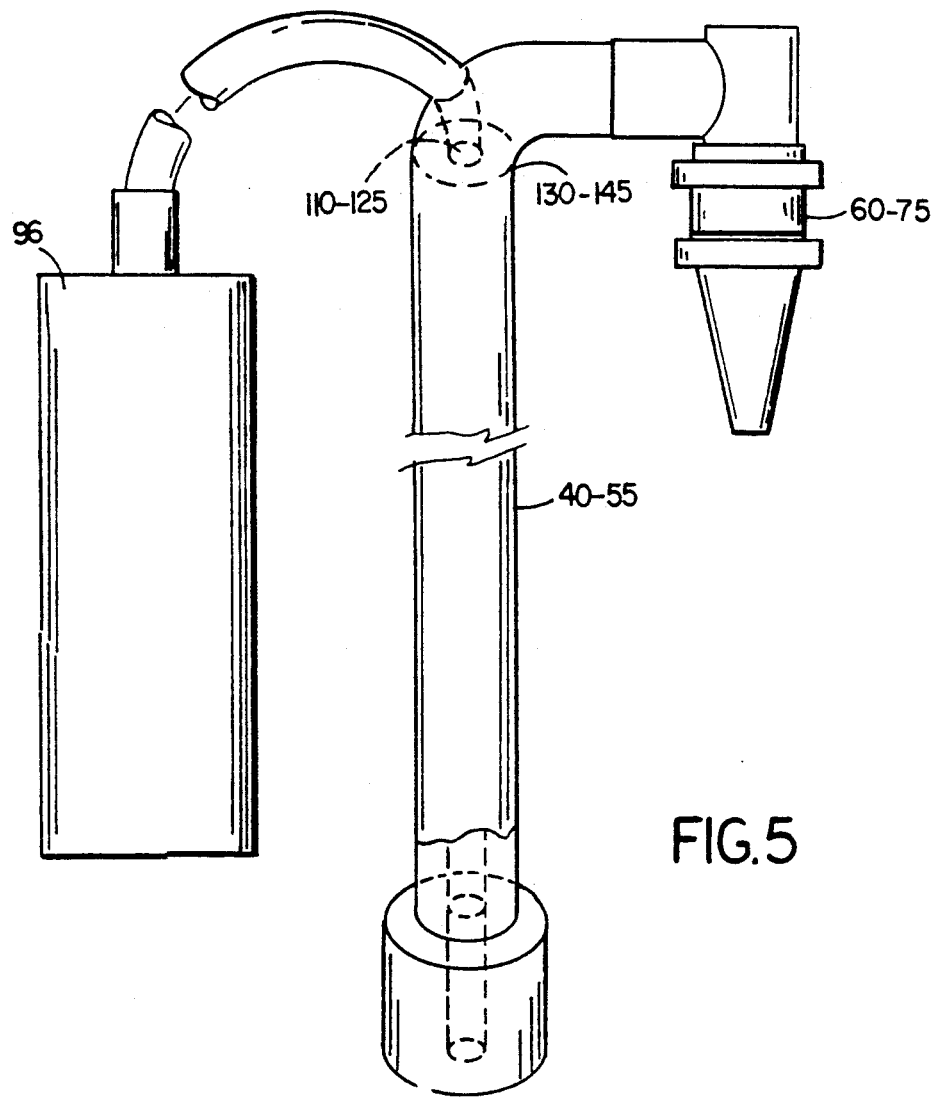
FIG. 5 is a view of a conduit with a vapor line and also connected to an outlet and a vapor source.

To create a cryogen spray, warm vapor (e.g. dry $N_2$) is supplied from an external vapor source 96 into sixteen vapor lines 110-125, each of which is positioned in the center of a conduit, as shown in FIG. 5 depicting a representative conduit. Vapor warms the cryogenic liquid and forces cryogen upward in spaces 130-145 around the outside of vapor lines 110-125. The cryogen is then sprayed onto workpieces on the conveyer.

Operation

The operation of the chilling apparatus 100 begins when liquid cryogen is being filled to a desired level in the reservoir. Sensors 91 and 92 are used to regulate what the desired liquid level. Workpieces are loaded onto the conveyer from a hopper and are being transported through the pre-cooling 16 in FIG. 1. Baffles are used in the pre-cooling stage to improve heat transfer between the workpieces and the cryogen counterflow. Workpieces are transported along the conveyer rails through the pre-cooling stage via openings 30-33 in the center of the baffles.

After the pre-cooling process, the conveyer rails guide workpieces to stage 18 to be sprayed with cryogen. There are sixteen conduits 40-55 immersed in the cryogenic fluid bath beneath the conveyer. The sixteen conduits are also connected to 16 outlets above the conveyer 60-75. Warm vapor is transported down the conduits 110-125, lowering the density of cryogen in the conduits. The outlets above the bath spray cryogen liquid and vapor directly onto the workpiece. The spraying also creates a counterflow of cryogen. Both the direct spraying, and the counterflow of cryogen resulted from the spraying, have a cooling effect on the workpieces. The counterflow in pre-cooling stage 16 pre-cools the workpieces at the beginning of the cooling assembly line.

After the pre-cooling and spraying process, the workpieces are properly shrunk. The workpieces will then be transported to a workstation and can fit or pressed into a larger assembly.

We claim:

1. An apparatus for chilling and shrinking workpieces being conveyed to a workstation on an assembly line, said apparatus comprising:
   a) a conveyor for transporting workpieces to the workstation, said conveyer being positioned over a bath adapted to contain cryogenic liquid,
   b) at least one generally vertical conduit which extends from within the cryogenic fluid bath to an outlet positioned above a portion of said conveyor, and
   c) means to heat cryogen in the conduit, thereby reducing the density of cryogen in the conduit, forcing cryogen to flow up the conduit and through the outlet onto workpieces on the conveyer.

2. The apparatus of claim 1 further comprising a pre-cooling stage upstream from the portion of the conveyor under said conduit outlet, said pre-cooling stage comprising
   means to produce a counterflow of cryogen in a direction opposing the direction of workpiece movement to pre-cool workpieces.

3. The apparatus of claim 2 in which baffles are positioned in the pre-cooling stage around the conveyer to localize circulation around the workpieces and allow good heat transfer.

4. The apparatus of claim 1 wherein the outlet connected to said conduit is a spray nozzle for distributing a spray of cryogenic fluid over said workpieces on the conveyer.

5. The apparatus of claim 1 wherein said means to reduce the density of cryogen in the conduit comprises a source of warm vapor to generate a flow of cryogenic liquid up the conduit.

6. The apparatus of claim 6 wherein said warm vapor source is positioned within the conduit.

7. The apparatus of claim 2 comprising a lid above the conveyer to maintain a blanket of cryogenic vapor above said conveyer, said apparatus comprising a weir extending higher than the conveyer and positioned away from the outlet, and a barrier higher than the weir positioned adjacent the outlet, whereby said cryogen flows in a counterflow to said workpieces and then over the weir.

8. An apparatus for chilling and shrinking workpieces being conveyed to a workstation on an assembly line, said apparatus comprising:
   a) a conveyer for guiding workpieces to the workstation,
   b) means to produce a counterflow of cryogen in a the direction opposing the direction of workpiece movement, and
   c) baffles positioned around the conveyer to localize circulation around the workpieces as they are guided through the baffles to the workstation, and to allow good heat transfer;
   d) a lid above the conveyer to maintain a blanket of cryogenic vapor above said conveyer,
   e) a weir extending higher than the conveyer and positioned away from the outlet, and
   f) a barrier higher than the weir positioned adjacent the outlet,
   whereby and said cryogen flows in a counterflow to said workpieces and then over the weir.

9. A method of chilling and shrinking workpieces being conveyed to a workstation on an assembly line, said method comprising:
   a) providing apparatus comprising, i) a conveyer positioned over a bath of cryogenic fluid to transport said workpieces, ii) at least one generally vertical conduit which extends from within the bath to an outlet above the conveyer, and
   b) heating cryogenic liquid in said conduit to reduce the density of said cryogen and force cryogen to flow up said conduit and through said outlet, where it is released onto workpieces on the conveyer.

10. The method of claim 9 further comprising first pre-cooling said workpieces with a counterflow of cryogenic vapor as said workpieces are transported along said conveyer, and then spraying said workpieces with cryogenic fluid released from said outlet.

11. The method of claim 10 further comprising providing baffles around portion of the conveyer used for pre-cooling, and moving said workpieces through said baffles as said cryogenic vapor flows in the direction opposite to conveyer movement through a space between the baffles and the workpieces.

12. The method of claim 10 further comprising first pre-cooling said workpieces with a counterflow of cryogenic vapor as said workpieces are transported along said conveyer, and then spraying said workpieces with cryogenic fluid released from said outlet, said counterflow being provided by providing: i) a lid; ii) a weir extending in a direction transverse to the conveyer to a height above the conveyer and positioned toward the inlet; iii) a barrier extending in a direction transverse to the conveyer to a height above the weir and positioned in the apparatus toward said workstation; and iv) a source of cryogen vapor positioned to deliver cryogen vapor along said conveyer at a location between said barrier and said weir, whereby a blanket of cryogenic vapor flows in a counterflow to said workpieces, and then over the weir.

13. The method of claim 9 further comprising providing warm vapor to reduce the density of cryogenic fluid in said conduit.

14. A method of chilling and shrinking workpieces being conveyed to a workstation on an assembly line, said method comprising:
   a) conveying said workpieces along a conveyer through baffles to said workstation,
   b) providing a counterflow of cryogenic vapor in a direction opposite to said workpieces through a space between the baffles and the workpieces to pre-cool said workpieces on said conveyer, said counterflow being created by providing apparatus comprising a lid above the conveyer to maintain a blanket of cryogenic vapor above said conveyer, said apparatus comprising a weir extending higher than the conveyer and positioned away from the outlet, and a barrier higher than the weir positioned adjacent the outlet, whereby said cryogen flows in a counterflow to said workpieces and then over the weir.

15. An apparatus for chilling and shrinking workpieces being conveyed to a workstation on an assembly line, said apparatus comprising:
   a) a conveyer for transporting workpieces to the workstation, said conveyer being positioned over a bath adapted to contain cryogenic liquid,
   b) at least one generally vertical conduit which extends from within the cryogenic fluid bath to an outlet positioned above a portion of said conveyer, and
   c) means to reduce the density of cryogen in the conduit, forcing cryogen to flow up the conduit and through the outlet onto workpieces on the conveyer, said apparatus further comprising a lid above the conveyer to maintain a blanket of cryogenic vapor above said conveyer, said apparatus comprising a weir extending higher than the conveyor and positioned away from the outlet, and a barrier higher than the weir positioned adjacent the outlet, whereby and said cryogen flows in a counterflow to said workpieces and then over the weir.

16. A method of chilling and shrinking workpieces being conveyed to a workstation on an assembly line, said method comprising:
   a) providing apparatus comprising, i) a conveyer positioned over a bath of cryogenic fluid to transport said workpieces, ii) at least one generally vertical conduit which extends from within the bath to an outlet above the conveyer, and
   b) reducing the density of cryogenic liquid in said conduit and forcing cryogen to flow up said conduit and through said outlet, where it is released onto workpieces on the conveyer,
   c) creating a counterflow of cryogen to precool said workpieces before said cryogen is released onto them from said outlet, said counterflow being created by providing apparatus comprising a lid above the conveyer to maintain a blanket of cryogenic vapor above said conveyer, said apparatus comprising a weir extending higher than the conveyor and positioned away from the outlet, and a barrier higher than the weir positioned adjacent the outlet, said outlet being positioned intermediate said barrier and said weir, whereby said cryogen flows in a counterflow to said workpieces, and then over the weir.

17. An apparatus for chilling and shrinking workpieces being conveyed to a workstation on an assembly line, said apparatus comprising:
   a) a conveyer for guiding workpieces to the workstation,
   b) means to produce a counterflow of cryogen in a the direction opposing the direction of workpiece movement, comprising, i) a cryogen outlet providing a source of cryogen for said counterflow, ii) a weir extending higher than the conveyer and positioned away from the outlet, and iii) a barrier higher than the weir positioned adjacent the outlet, said outlet being positioned intermediate said barrier and said weir, whereby said cryogen flows in a counterflow to said workpieces, and then over the weir.

18. A method of chilling and shrinking workpieces being conveyed to a workstation on an assembly line, said method comprising:
   a) conveying said workpieces along a conveyer to said workstation,
   b) providing a counterflow of cryogenic vapor from a cryogen outlet in a direction opposite to said workpieces to cool said workpieces on said conveyer, said counterflow being created by providing apparatus comprising a weir extending higher than the conveyer and positioned away from the outlet, and a barrier higher than the weir positioned adjacent the outlet, said outlet being positioned intermediate said barrier and said weir, whereby said cryogen flows in a counterflow to said workpieces and then over the weir.

* * * * *

UNITED STATES PATENT AND TRADEMARK OFFICE
CERTIFICATE OF CORRECTION

PATENT NO. : 5,083,436

DATED : January 28, 1992

INVENTOR(S) : Thornton Stearns et al.

It is certified that error appears in the above-identified patent and that said Letters Patent is hereby corrected as shown below:

Column 1, line 50, insert --path.-- after "closed".

Column 4, line 54, "conveyor" should be --conveyer--.

Signed and Sealed this

Thirtieth Day of August, 1994

Attest:

BRUCE LEHMAN

Attesting Officer

Commissioner of Patents and Trademarks